(12) United States Patent
Kogan

(10) Patent No.: US 8,996,516 B2
(45) Date of Patent: Mar. 31, 2015

(54) ADJACENT SEARCH RESULTS EXPLORATION

(71) Applicant: Google Inc., Mountain View, CA (US)

(72) Inventor: David Kogan, Natick, MA (US)

(73) Assignee: Google Inc., Mountain View, CA (US)

( * ) Notice: Subject to any disclaimer, the term of this patent is extended or adjusted under 35 U.S.C. 154(b) by 76 days.

(21) Appl. No.: 13/732,985

(22) Filed: Jan. 2, 2013

(65) Prior Publication Data
US 2014/0188844 A1 Jul. 3, 2014

(51) Int. Cl.
*G06F 17/00* (2006.01)
*G06F 17/30* (2006.01)

(52) U.S. Cl.
CPC .... *G06F 17/30274* (2013.01); *G06F 17/30268* (2013.01)
USPC ........... 707/731; 707/706; 707/722; 707/736; 707/758; 706/12; 706/14

(58) Field of Classification Search
None
See application file for complete search history.

(56) References Cited

U.S. PATENT DOCUMENTS

| | | | |
|---|---|---|---|
| 7,177,948 B1 * | 2/2007 | Kraft et al. ................. | 709/246 |
| 7,317,816 B2 | 1/2008 | Ray et al. | |
| 7,644,373 B2 * | 1/2010 | Jing et al. ................... | 715/838 |
| 7,672,977 B2 * | 3/2010 | Hara et al. ............. | 707/999.107 |
| 7,711,732 B2 | 5/2010 | Pedersen et al. | |
| 7,814,086 B2 | 10/2010 | Bartz et al. | |
| 7,840,577 B2 | 11/2010 | Ortega et al. | |
| 8,024,326 B2 | 9/2011 | Tong et al. | |
| 8,086,600 B2 * | 12/2011 | Bailey et al. ............... | 707/723 |
| 8,244,750 B2 | 8/2012 | Gade et al. | |
| 8,312,374 B2 * | 11/2012 | Ozawa et al. .............. | 715/702 |
| 2006/0288124 A1 * | 12/2006 | Kraft et al. ................ | 709/246 |
| 2007/0174790 A1 * | 7/2007 | Jing et al. .................. | 715/838 |
| 2007/0174872 A1 * | 7/2007 | Jing et al. .................... | 725/46 |
| 2008/0140647 A1 * | 6/2008 | Bailey et al. ................... | 707/5 |
| 2008/0222099 A1 * | 9/2008 | Morgana ......................... | 707/3 |
| 2010/0053408 A1 * | 3/2010 | Ozawa et al. .......... | 348/333.01 |
| 2012/0124036 A1 * | 5/2012 | Ramos et al. .............. | 707/723 |
| 2012/0317097 A1 * | 12/2012 | Tseng ......................... | 707/722 |
| 2013/0006972 A1 * | 1/2013 | Ramos et al. .............. | 707/722 |

OTHER PUBLICATIONS

International Search Report and Written Opinion in International Application No. PCT/US2014/010029, mailed Oct. 2, 2014, 13 pages.

* cited by examiner

*Primary Examiner* — Hung Le
(74) *Attorney, Agent, or Firm* — Fish & Richardson P.C.

(57) ABSTRACT

The specification relates to the creation of an image space by receiving an initial image query. A plurality of search queries related to the initial search query are determined. Image results for the initial search query and the plurality of related search queries are obtained. A panel of images representing a number of images from the initial search query and panels of images representing a number of images from the plurality of related search queries are generated. These panels are used to provide an image space. The image space can be centered on the panel representing the resultant images related to the initial search query and can be surrounded by panels representing the resultant images related to the plurality of related search queries.

23 Claims, 15 Drawing Sheets

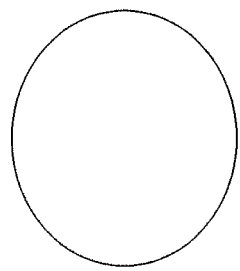
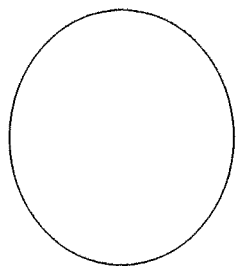
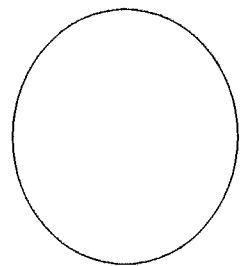
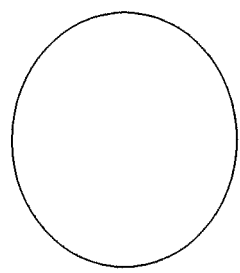
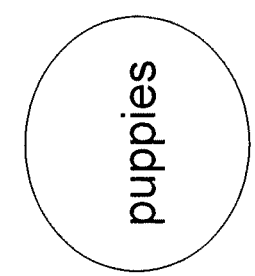
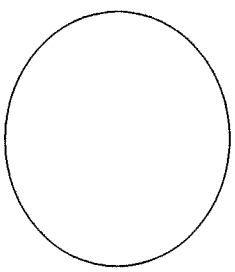
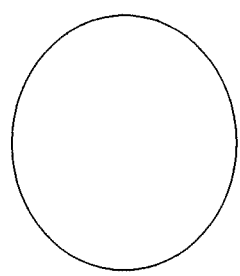
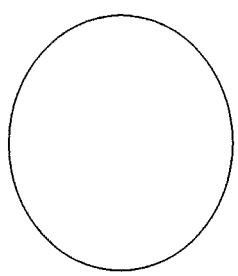
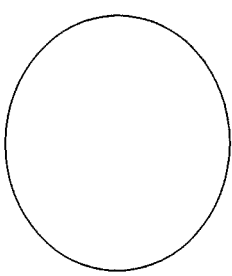
Figure 4

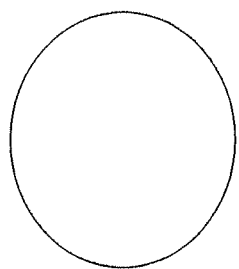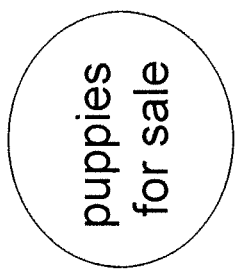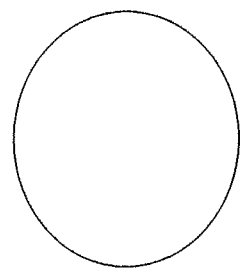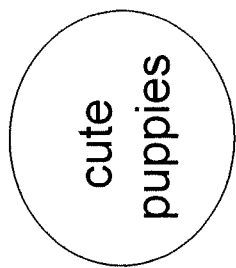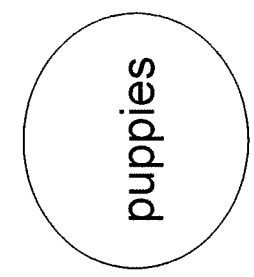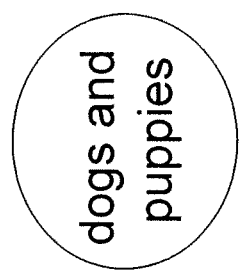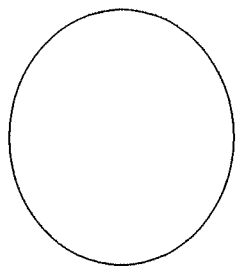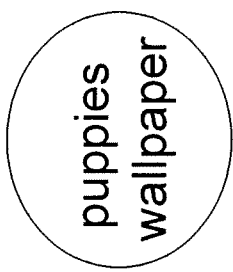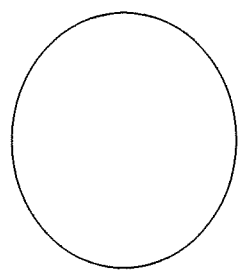
Figure 5

Initial search query O

| 10 | 20 | 30 | 40 | 50 | 60 |
| 9  | 19 | 29 | 39 | 49 | 59 |
| 8  | 18 | 28 | 38 | 48 | 58 |
| 7  | 17 | 27 | 37 | 47 | 57 |
| 6  | 16 | 26 | 36 | 46 | 56 |
| 5  | 15 | 25 | 35 | 45 | 55 |
| 4  | 14 | 24 | 34 | 44 | 54 |
| 3  | 13 | 23 | 33 | 43 | 53 |
| 2  | 12 | 22 | 32 | 42 | 52 |
| 1  | 11 | 21 | 31 | 41 | 51 |

Related search query N

| 10 | 20 | 30 | 40 | 50 | 60 |
| 9  | 19 | 29 | 39 | 49 | 59 |
| 8  | 18 | 28 | 38 | 48 | 58 |
| 7  | 17 | 27 | 37 | 47 | 57 |
| 6  | 16 | 26 | 36 | 46 | 56 |
| 5  | 15 | 25 | 35 | 45 | 55 |
| 4  | 14 | 24 | 34 | 44 | 54 |
| 3  | 13 | 23 | 33 | 43 | 53 |
| 2  | 12 | 22 | 32 | 42 | 52 |
| 1  | 11 | 21 | 31 | 41 | 51 |

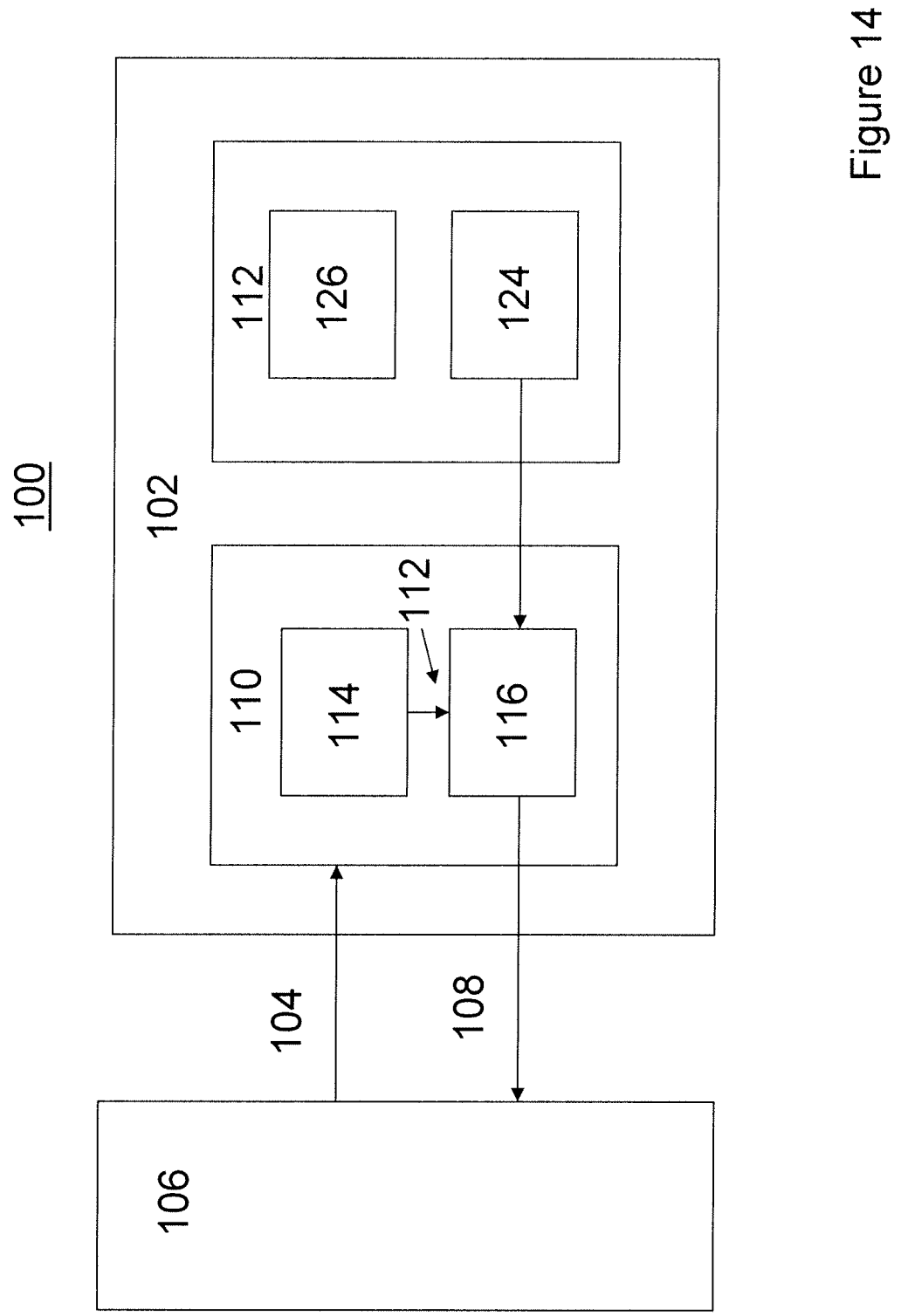

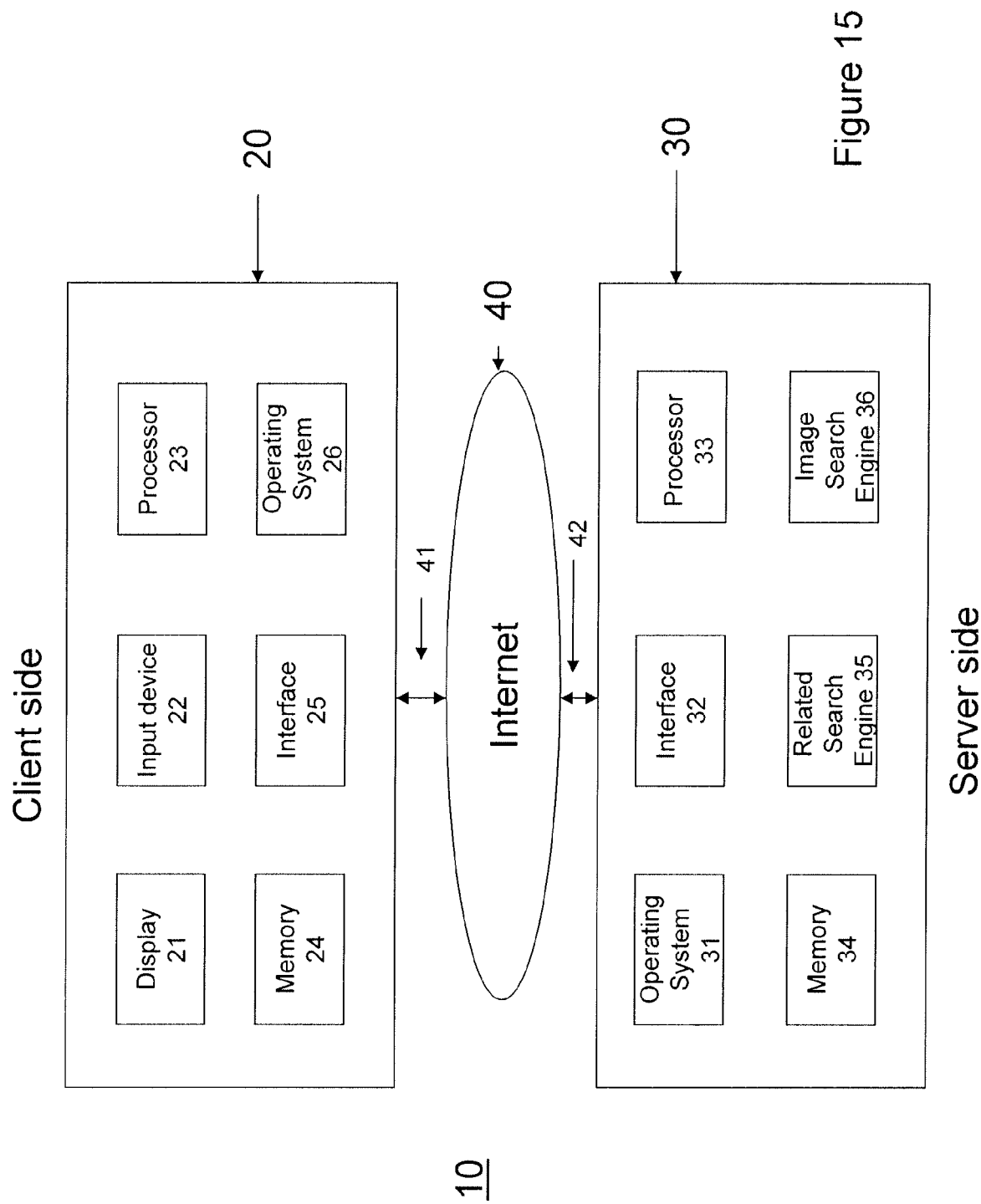

ADJACENT SEARCH RESULTS EXPLORATION

BACKGROUND

The subject matter described herein relates to adjacent search results exploration in an image retrieval system. An image retrieval system is a computer system for browsing, searching and retrieving images from a repository of digital images. Many image retrieval systems add metadata, e.g., captioning, keywords, or descriptions, to the images so that retrieval can be performed utilizing the metadata. This type of search is called an image meta search. It allows a user to look for images using keywords or search phrases. As a result, a user can receive a set of images that can reference image resources, e.g., thumbnail images, and can be sorted by relevancy.

In use, a user can perform an image search by searching for image content using an input query. The relevant images are presented to a user and the user can browse the relevant images for a desired image. An image presented can include a static, graphic representative of some content, for example, photographs, drawings, computer generated graphics, advertisements, web content, book content or a collection of image frames, for example, a movie or a slideshow.

SUMMARY

An interactive computer environment allows a user of a client to browse sets of images for a desired, target image.

A user of a client provides an image search query to a system. Upon receiving the search query, the system analyzes the image search query and determines a plurality of related image search queries. The analysis can be performed by a related-query engine.

The initial image search query and the plurality of related image queries are sent to an image search engine. Panels of images are obtained from the image search engine results of the initial image search query and the related image search. The panels can include a number of images associated with respective search queries. Specifically, the panels can include tiled images associated with respective search queries. These panels are used to provide an image space. The center of the image space can be a panel representing image results for the initial search query and can be surrounded by panels representing image results for the plurality of search queries related to the initial search query.

A user of a client can browse the image space provided to a client display by panning in all directions and zooming in and out of view. As the user of the client pans the display in a specific direction more and more related query panels are created by the related-query engine in conjunction with the image search engine. The client display can pan out indefinitely or until an end of related query searches is reached. If the user of the client finds a relevant panel, the client display can zoom into the panel and the user can view the related query and browse all images associated with this query. If a target image is found, the user of the client can click on the displayed image and be provided with a landing page. If no target image is found, the client display can zoom out and a search can continue.

In an implementation of the subject matter described in this specification, the methods comprise the steps of receiving an initial image query. A plurality of search queries related to the initial search query are determined. Image results for the initial search query and the plurality of related search queries are obtained. A panel of images representing a number of images from the initial search query and panels of images representing a number of images from the plurality of related search queries are generated. These panels are used to provide an image space. The image space can be centered on the panel representing the resultant images related to the initial search query and can be surrounded by panels representing the resultant images related to the plurality of related search queries.

The system is capable of receiving at least one input to browse the image space and modify the image space responsive to the at least one input. The image space can be modified by panning the image space in an x-y direction or zooming into and out in the z-direction. When the image space is fully zoomed in on a particular panel, the particular panel can be expanded to show all images associated with an image query related to that panel. Also, as the image space is being panned, the related queries engine can produce more related search queries by additively weighing adjacent queries.

Additionally, as the image space is being panned, a related queries engine can account for viewed panels so they are not shown again. The related queries engine can also create a back edge for the initial search query in order to reduce a possibility of dead ends. Further, the related queries engine can split keywords of a query into at least two sections and perform a related query search on at least one of the sections. The system can also receive at least one input indicating a target image was found and provide a landing page associated with the target image.

In another implementation, a system comprises one or more processors and one or more computer-readable storage mediums containing instructions configured to cause the one or more processors to perform operations. The operations can include receiving an initial image query. A plurality of search queries related to the initial search query can be determined. Image results for the initial search query and the related search queries are obtained. A panel of images representing a number of images from the image search engine resulting from the initial search query, and panels of images representing a number of images from the image search engine resulting from the plurality of related search queries are generated. These panels are used by the system to provide an image space. The image space can be centered on the panel representing the number of resultant images for the image search engine related to the initial search query and can be surrounded by the panels representing the number of resultant images for the image search engine related to the plurality of related search queries.

In another implementation, a computer-program product tangibly embodied in a machine-readable storage medium can include instructions configured to cause a data processing apparatus to receive an initial image query. A plurality of search queries related to the initial search query are determined. Image results for the initial search query and the plurality of related search queries are obtained. A panel of images representing a number of images from the image search engine resulting from the initial search query and panels of images representing a number of images from the image search engine resulting from the plurality of related search queries are generated. The data processing apparatus uses these panels to provide an image space. The image space can be centered on the panel representing the number of resultant images for the image search engine related to the initial search query and can be surrounded by the panels representing the number of resultant images for the image search engine related to the plurality of related search queries.

This interactive computer environment and system is more efficient and reliable since it reduces the time necessary to find a desired image. It also utilizes less resources, while providing greater flexibility, when searching for an image.

BRIEF DESCRIPTION OF THE DRAWINGS

FIGS. 4-8 are pictorial representations of an example method for obtaining related search queries;

FIGS. 9-13 are example representations of image spaces used in accordance with the disclosed technology;

FIG. 14 is a block diagram of an example of a search system used with the disclosed technology; and FIG. 15 is a block diagram of an example of a system used with the disclosed technology.

DETAILED DESCRIPTION

An interactive computer environment and system that can be used as an exploration tool for viewing and navigating search queries and related search queries results. The system allows a user of a client to visually explore a variety of search results related to a query by efficiently exploring image data sets and related image data sets. Search results are laid out such that each individual search result set is viewed as a separate entity when viewed in a close view. The user of the client can zoom out and explore related queries as though they exist in an infinite plane in every direction, and zoom back into individual results to interact with them, as needed.

The image space can be defined as a visual representation of image resources and can be presented to a user of a client on a display or a similar device, as will be described more fully below. In some implementations, images are searched, however, the system is capable of applying the disclosed technology to any data where searches can be applied including video, text documents, audio, meta-data and others.

Figure 1:
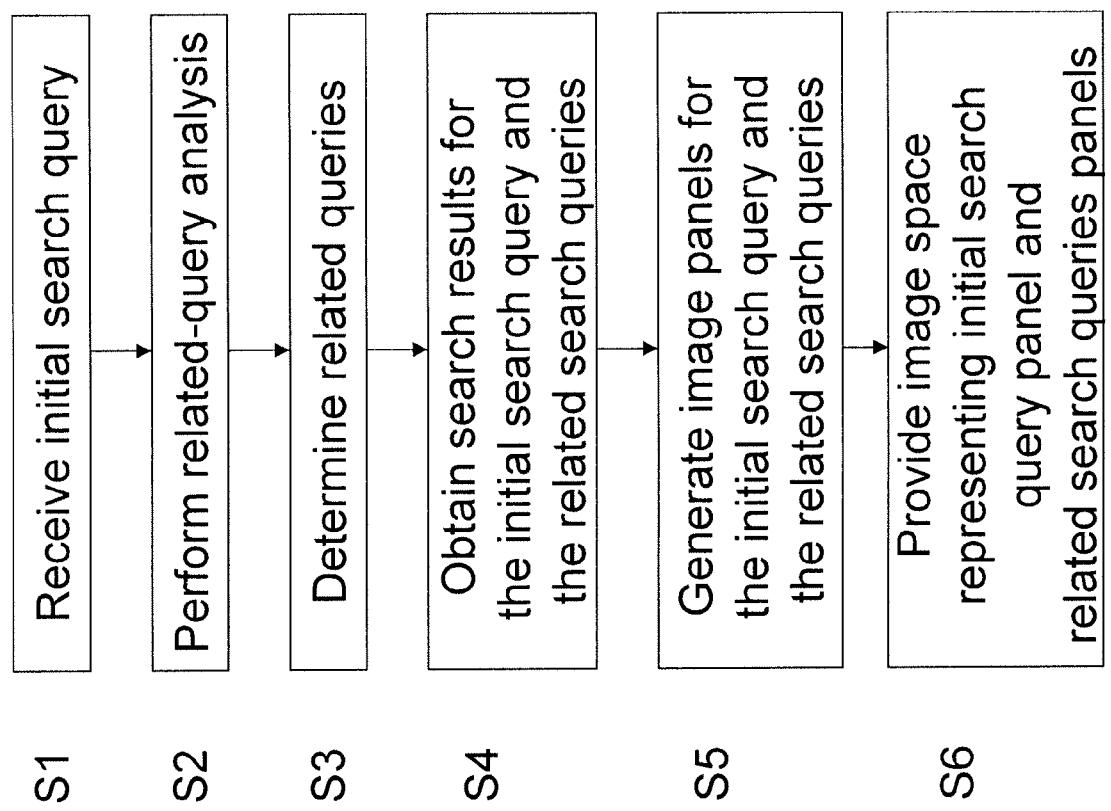
FIG. 1 is a flow chart showing an example process for providing image search results.

FIG. 1 is a flow diagram of an example of a method for providing image search results. Image search results generally include versions of image resources, e.g., thumbnails, that are determined to be responsive to a submitted search query. These representations of the image resources typically are presented rather than the actual image resources themselves, although it is possible to present the actual image resources. The term image in the specification can refer to either an image resource or a representation of the image resource.

The method of FIG. 1 can be described with respect to a system, e.g., a search system as shown in FIG. 14, including one or more computing devices, that performs the methods. In Step Si, the system receives an initial image search query. The image search query can be a search query for image content responsive to the query. For example, the system can receive a query that describes a particular image or type of image using text. Or, the image search query can provide information about one or more images associated with a topic, a website, a webpage, an offline database, an online database, a repository, a transaction, a document, a photograph, a drawing, or other content. The image search query can also include one or more query terms identifying requested image content. These query terms can identify (1) one or more search strings, e.g., 'puppies for sale,' 'German shepherd puppies,' 'puppies and kittens,' (2) image features, e.g., color, texture, dimension, (3) file type, e.g., bitmap, jpeg, tiff, or (4) a combination of the above or others. Moreover, in some implementations, the query itself can be an image.

In Step S2, the system analyzes the image search query. The analysis can be performed by a related-query engine, a knowledge graph, a popular-queries engine, or the system can use a recent search history. In some implementations, a related-query engine employing an infinite or near-infinite related-query algorithm can be used. Specifically, the system can begin with a single query, and as the system builds an image space, the related-query engine can be consulted to determine optimal related queries and their placement within the image space. As the image space grows, the related-queries engine uses nearby queries as seeds for new queries. As the image space gets larger, the related-query radius can be grown such that farther the result from the result of the initial search query, the less related to the original query than those queries closest to the initial query. A more full explanation of the related-query engine will be described below.

In Step S3, the analysis of Step 2 determines related image search queries. The received initial image search query and the determined related image queries are sent to an image search engine. In this example, the received image search query and the determined plurality of related image queries are sent to an image search engine at the same time or close to the same time but these queries can be sent to the image search engine individually and at different time intervals. Regardless, the image search engine will perform an image search for each query separately and obtain search results (Step S4). These search results identify images that are responsive to the individual queries. The image search results can identify corresponding image resources relevant to the image queries. For example, the image search engine can index and store meta data of an image set and, when an image query is performed, the image search engine uses the index to match the query with the stored data. The results are presented in order of relevancy through the use of a ranking engine that ranks image search results responsive to a received query according to one or more criteria. The ranking may be performed using a ranking engine as described in FIG. 14.

The resultant images for each query search can be grouped in sets corresponding to similarities and intersections, e.g., visual, non-visual, or both, among the images. This can be implemented in various ways, including using a script, HTML (Hypertext Markup Language), or both, in a web browser program. Thus, the implementation can be such that it is independent of specific platforms or browser software. Other implementations are also possible.

Once the search results for each query are identified, panels of tiled images representing the individual search results are generated (Step S5). Tiled images are an example of a display option but other display options are available, e.g., a circular pattern of images can be provided. The panels can include a number of images associated with a respective search query. That is, the panel can show a specified number of the highest ranked images for the query or the panel can contain a specified number of representative images for each search result grouping, (e.g., see FIGS. 10-12).

These tiled panels are used to provide an interactive image space (Step S6). A center of the image space can be the panel representing the results from the initial search query and this center panel can be surrounded by the panels representing the search results for the related-search queries. This image space format can be presented in other fashions and formats using the same underlying techniques.

Figure 2:
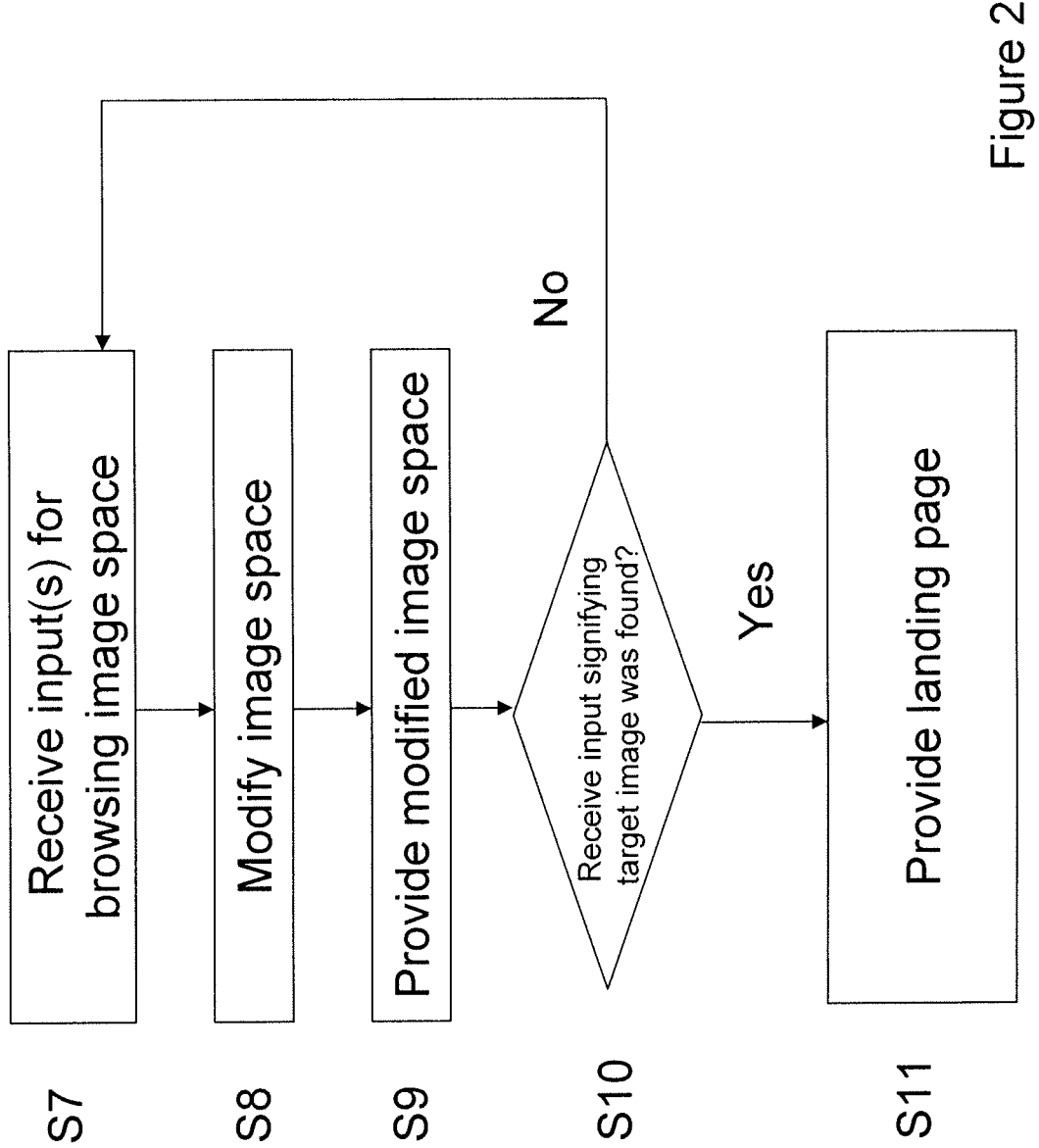
FIG. 2 is a flow chart showing an example process for modifying an image space.

FIG. 2 is a flow diagram of an example of a method for modifying the image space. As a user of a client browses the image space for a target image, the system can receive inputs for manipulating the image space (Step S7). Based on these received inputs, the system modifies the image space by providing additional related search query results (Step S8). This modified image space is provided to a client side (Step S9). The inputs can allow the image space to: zoom out, zoom in, and pan left, right, up, down, or any combination of these. The zooming and panning can be performed (in part) so that when zooming out, a first zoom level is shown where fewer images are displayed in each image panel but more image panels can be shown and when zooming in, a second zoom level where more images are displayed in each image panel but fewer image panels can be shown.

For example, (1) upon zoom out, the image space can display multiple image panels on a single display, (2) upon zoom in, the image space can zoom in until a single query showing all image search results for the query are shown, and (3) upon panning, the image space will show panels that were not in view but are related to the adjacent panels in view, as will be described more fully below. Such modifications can be performed by the device at which the images are displayed, on its own, using code sent by a server device in one communication session, or through ongoing interactions with a server system.

These inputs can be received by the system until the system receives an input signifying that a target image is found (Step S10). Once, the system receives such target input, the system will provide a landing page for viewing the target image in a non-search capacity. (Step S11).

Figure 3:
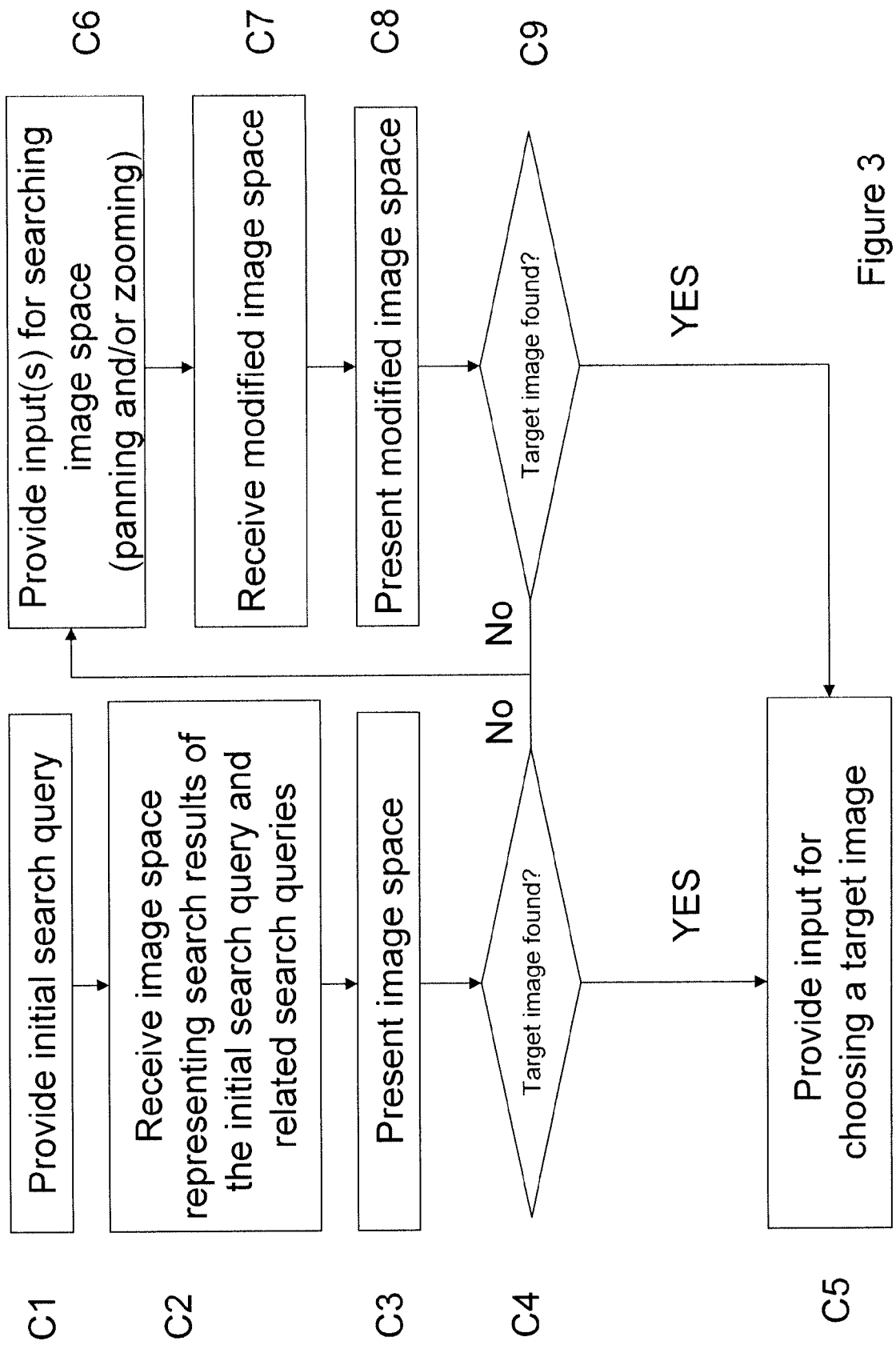
FIG. 3 is a flow chart showing an example process for allowing a client to create and manipulate an image space.

FIG. 3 is a flow diagram of an example of a method for allowing a client to create an image space on a display and a user of the client to manipulate the image space. In Step C1, a user of a client provides a search query to the system. In turn, as described above, the system will provide an image space to the client side. In Step C2, this image space is received by the client side. The image space will be presented to the client in Step C3. The presenting can be performed by a device at which the images are displayed, or a server device can present the client interface by sending code to a receiving device that renders the code to cause the display of the client interface being presented.

In Step C4, if the image space being presented contains the target image, the user of the client can provide the system with an input signifying the target image was found (Step C5). If the target image was not found, the user of the client can browse the image space by providing inputs to the system (Step C6), e.g., panning the image space or zooming in and out of the image space.

Several methods of interacting with the client interface are possible. On a touchscreen interface, e.g., used on a mobile device or tablet, zooming can be performed by the use of a single-finger or multi-finger gesture and panning can be performed with a drag gesture. On a desktop, web-based interface, the mouse scroll wheel, assigned zoom keys, or both, can be used to control the zoom input and panning can be controlled using a mouse drag, using a keyboard (e.g., through use of the arrow keys), or both. Other inputs can also be programmed to perform other operations in the client interface, e.g., input signifying a target image was found. Other interfaces can also be utilized, e.g., augmented reality glasses that interact with the client interface using voice and eye commands.

In addition, the following description can include rescaling of images in response to zooming in and out, but some implementations need not employ rescaling. Images displayed in the client interface can be rescaled in accordance with a scaling factor governed by the input to zoom in and the input to zoom out. For example, a scaling factor value can be retained in memory, where the scaling factor value is directly modified in response to the zoom input, and the scaling factor can be used to adjust the sizes of the images displayed in the client interface. As the input causes the interface to zoom in, the displayed images can be made larger until they are replaced by more images from a different zoom level. Likewise, as the input causes the interface to zoom out, the displayed images can be made smaller until are replaced by fewer images from a different zoom level.

After the user of the client has provided the browsing inputs, the client will receive a modified image space (Step C7) and this image space will be presented to the user of the client on a display (Step C8). The modified client interface can continue to show more and more related query panels being created as the user of the client pans out indefinitely or until an end of related query searches is reached, e.g., the related query engine utilized all queries within its repository. If the user of the client finds a relevant panel, the client display can be zoomed into the panel and the user of the client can view the related query and browse all images associated with this query. If a target image is found (Step C9), the user of the client can touch-click or mouse-click or otherwise designate the image (Step C5) and be provided with a landing page. If the target image is not found (Step C9), the user of the client can continue to provide browsing inputs to the system until the target input is found. An additional feature allows a user of a client to move forward and back between zoomed-in panels if the user of the client wants to browse through their past search results.

As shown in FIGS. 4-8, the related-query engine builds a dynamic client interface by implementing an algorithm that establishes the related query terms and their arrangement within the client interface. In an example, if the initial search query is 'puppies,' 'puppies' can become the center of the image space as shown in FIG. 4. 'Puppies' will be sent to the related search engine. One type of algorithm used in the related-query engine can produce the related query terms based on previous image searches submitted to a search system, e.g., "puppies", and previous search refinements that were utilized to return more relevant or more accurate results, e.g., refine "puppies" to "great dane puppies." Once the algorithm receives the initial search query, the algorithm analyzes the search query and, in this example, returns four of the highest weighted search terms in relation to 'puppies.' In this example, the algorithm returned 'puppies for sale,' 'dogs and puppies,' 'puppies wallpaper,' and 'cute puppies' as these were the most common search refinements for an initial query of 'puppies.' The system can use these related query results to fill in the cardinal directions of the image space (up, down, left right) with respect to the initial search term, as shown in FIG. 5.

Figure 6:
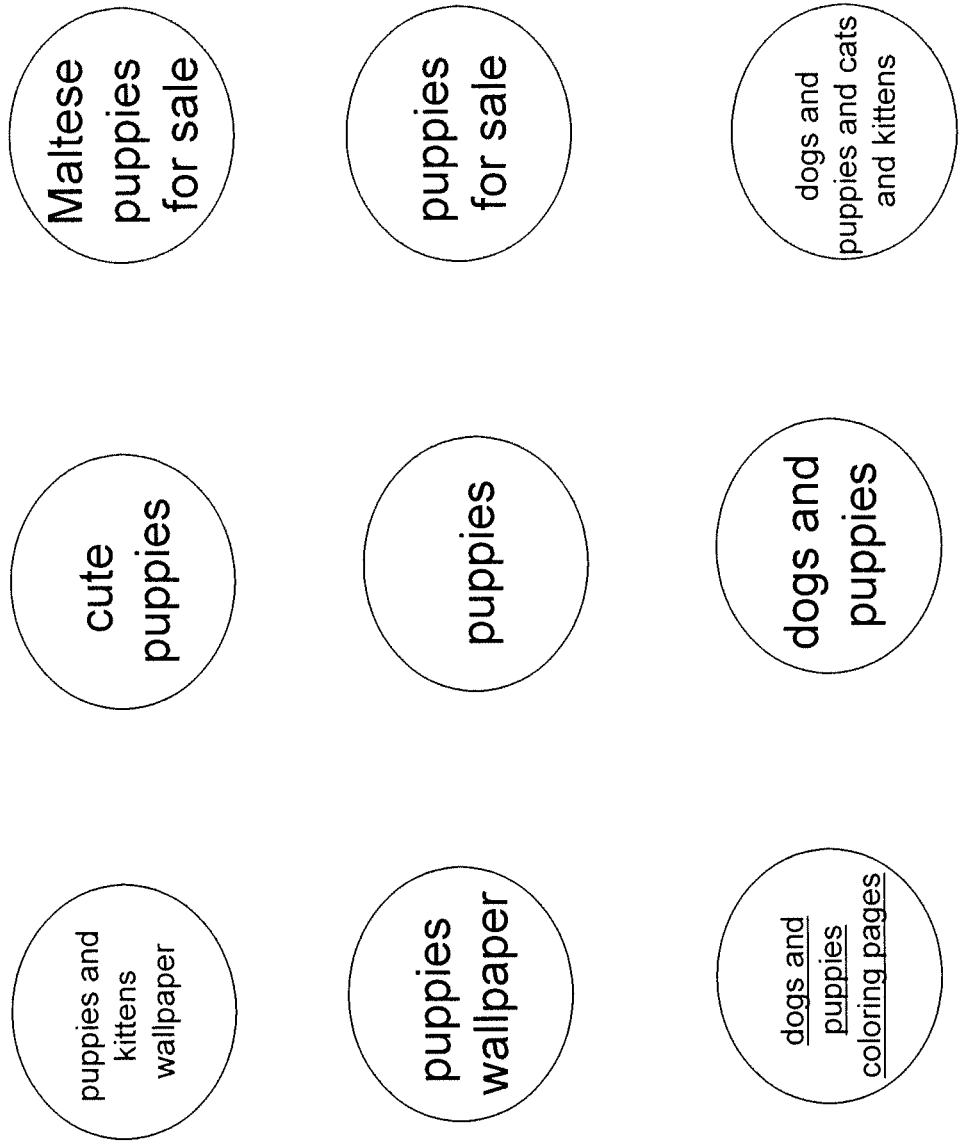

After the algorithm establishes the cardinal directions, the algorithm expands the related queries based on things that relate to all nearby queries of an empty space. In this example, the search engine will fill in the empty space within the image space, e.g., the corners of the image space, using an additive calculation that uses the nearby search queries to tabulate the highest-weighted, related-search query for the additive result of the nearby queries. (FIG. 6.) For example, to fill the top left corner, the related search engine grouped together in an additive result, 'cute puppies, 'puppies' and 'puppies wallpaper.' The algorithm used the highest-weighted search query that connected these groups together. In this example, the related search engine returned a search query of 'puppies and kittens wallpaper.' This method was followed for the remaining corners.

Figure 7:
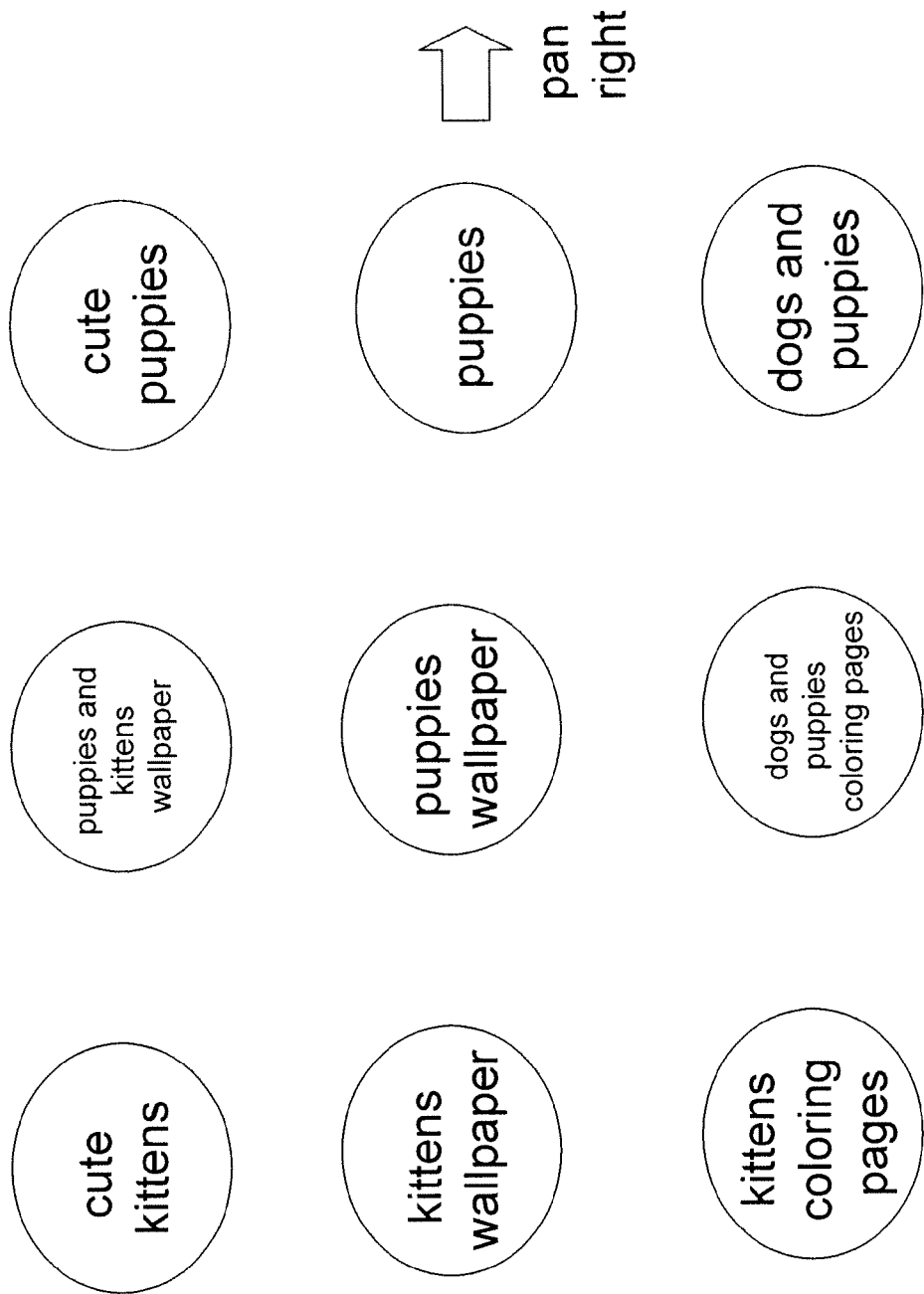
Figure 8:
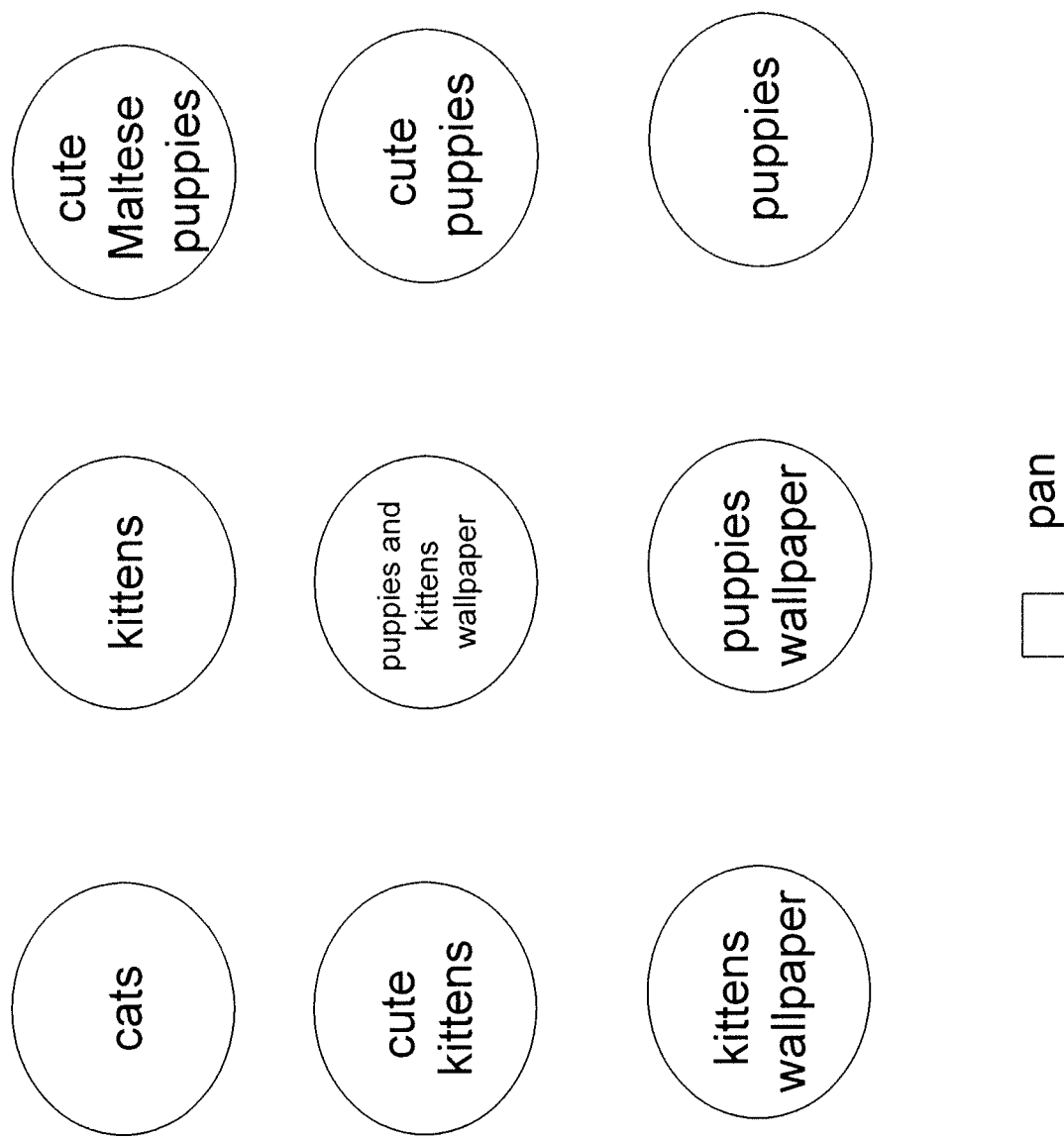

In use, the algorithm keeps tabulating new related queries as the client display pans the image space and the algorithm keeps filling in the related search queries by following the strongest weighted query for an additive result. In FIG. 7, the client display is panned right and the related search engine produced results for three more nodes on the left side. In FIG. 8, the client display is panned down and the top nodes were filled with more related search results.

The algorithm also makes it possible to explore related search results without running into the problems of: (1) dead ends, e.g., 'raven'→'raven bird'→'raven bird head'→'raven bird face'→dead end, (2) repeats, e.g., 'raven'→'raven bird'→'raven bird head'→'raven bird face'→'raven bird head'→'raven bird nest', (3) getting stuck in a loop, e.g., 'raven'→'raven bird'→'raven bird head'→'raven bird face'→'raven bird head'→'raven bird head', ect., or (4) getting stuck in a very specific type of search, e.g., if the initial query is 'Britney Spears,' it can be difficult to escape queries related to female celebrities.

To overcome these difficulties, the algorithm compensates using various procedures so that the algorithm can continually provide related search terms in the event the algorithm runs into one of the above problems.

First, the algorithm accounts for queries that have been viewed so that any viewed query will not be used more than once. In other words, any query that appeared in the client's visual field will not be repeated.

Second, if a query has too many descriptors so that a related-query engine runs into a dead end, the algorithm can have a reflective feature that creates a back edge for specific queries. For example, if a query transitions from 'raven'→'raven bird'→'raven bird head'→'raven bird face'→dead end. The engine will create a back edge from raven bird. The back edge being "raven" in this example but may be any descriptor from the previous query. This back edge is weighed less, but is still useful for exploration when dead ends turn up.

Third, when using the related search engine, the algorithm, using a designated memory, can account for the current query and other nearby queries. So, if the initial query is 'bird' and a nearby item is 'cat', the algorithm can search for queries related to both 'bird' and 'cat' and weigh the results additively. This way, if something is related to both, the algorithm can use that query, but if the algorithm does not find a query related to both, the algorithm can still use 'bird' or 'cat' alone. Furthermore, if the algorithm cannot find a related search query when using the nearby queries, the system can investigate queries a further distance away than the adjacent panels.

Fourth, if the algorithm is unable to find anything related to a current query string, the algorithm can split the string into keywords and search those keywords individually, e.g., 'Tokyo at night' can be split into queries related to 'Tokyo' or 'night'. If that fails or in addition to that, the system can investigate substrings of the queries or the algorithm can break up the query in subcomponents that are weighed individually. In some instances the algorithm can use a single letter to signify a query. These fallbacks are scored less than full matches but are useful when running into dead ends.

In the above implementations, the algorithm was used to find queries related to image data but the technology is not limited to image data and can be used to find queries related to any data where searches can be applied, e.g., text documents and other visual-oriented data, such as, videos, books (using covers) and music (using album covers and/or artist photos).

FIGS. 9-13 show an example of zoom levels for an interactive client interface. As shown in FIG. 9, zoom level 1 includes images returned in response to the initial query. Each of the images in level 1 is ranked in accordance with the image search engine described above.

Figure 10:
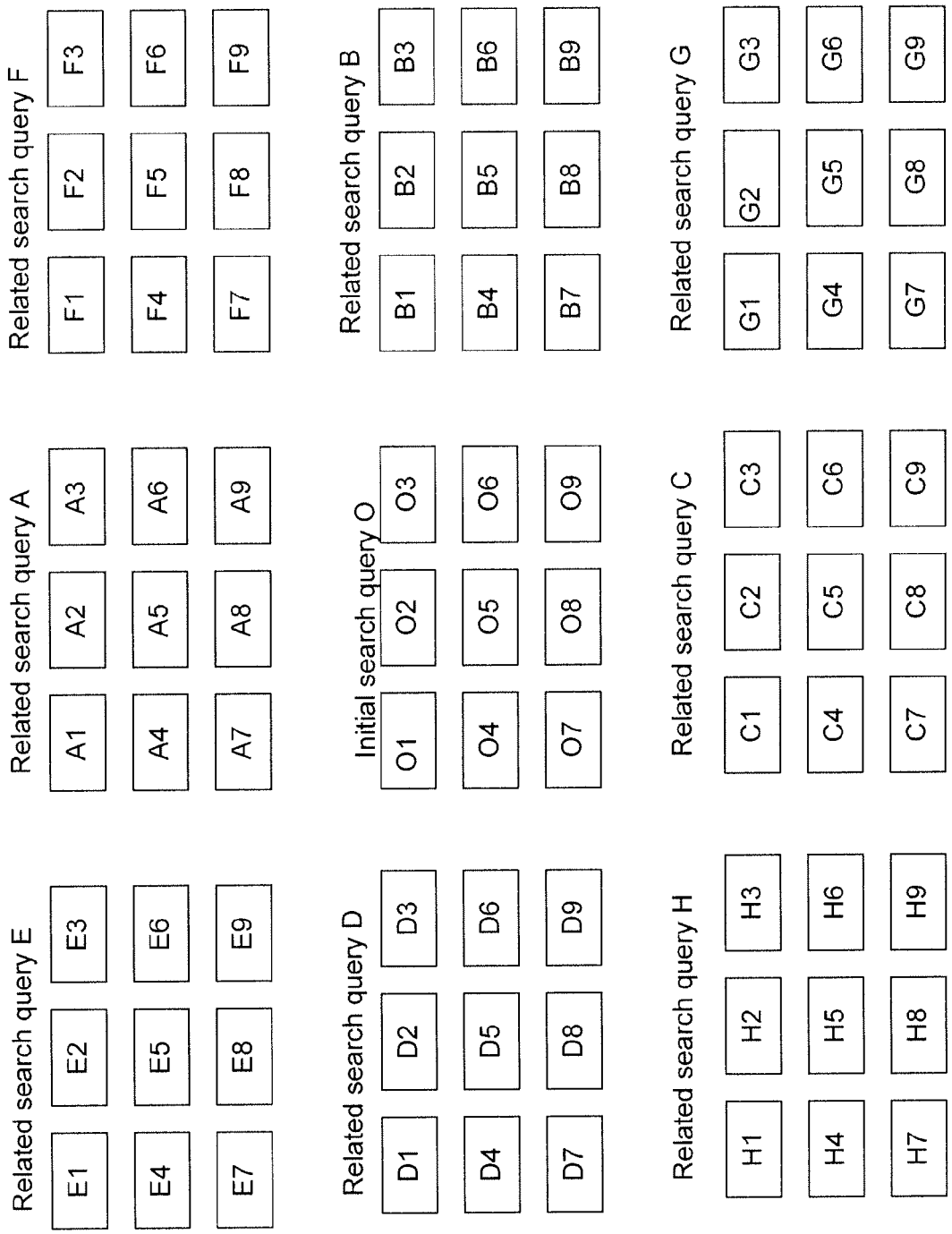

Once the client display is zoomed out from the displayed images by a predefined amount, level 1 is replaced with level 2, as shown in FIG. 10. In level 2, the image panels are arranged with the initial search query O being at the center of the image space. This center query is surrounded in the cardinal directions (top, right, bottom and left) with the heaviest weighted search queries A, B, C and D. The corners of the image space are filled with related search queries E, F, G, and H. Related search queries E, F, G, and H are additive results of adjacent search queries, meaning related search query E is a related search query for search query A+O+D, related search query F is a related search query for search query A+O+B related search query G is a related search query for search query B+O+C, related search query H is a related search query for search query D+O+C. For ease of explanation, only two zoom levels are described but any number of zoom levels can be used.

Figure 11:
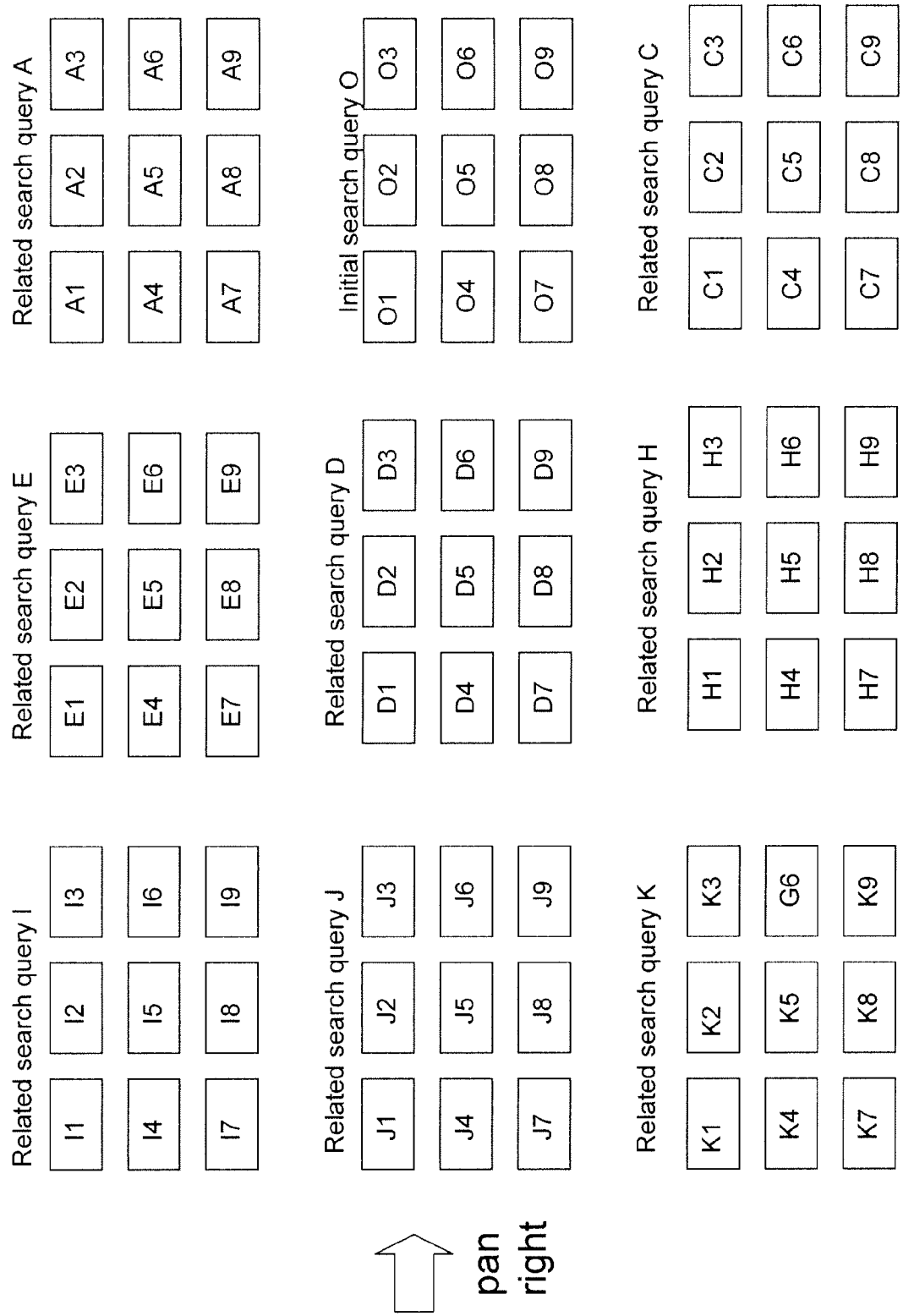

In FIG. 11, the image space was panned to the right and related search queries were filled in with related search queries I, J, and K. These search queries are additive results of adjacent search queries, meaning related search query I is a related search query for search query E+D, related search query J is a related search query for search query E+D+H, related search query K is a related search query for search query D+H.

Figure 12:
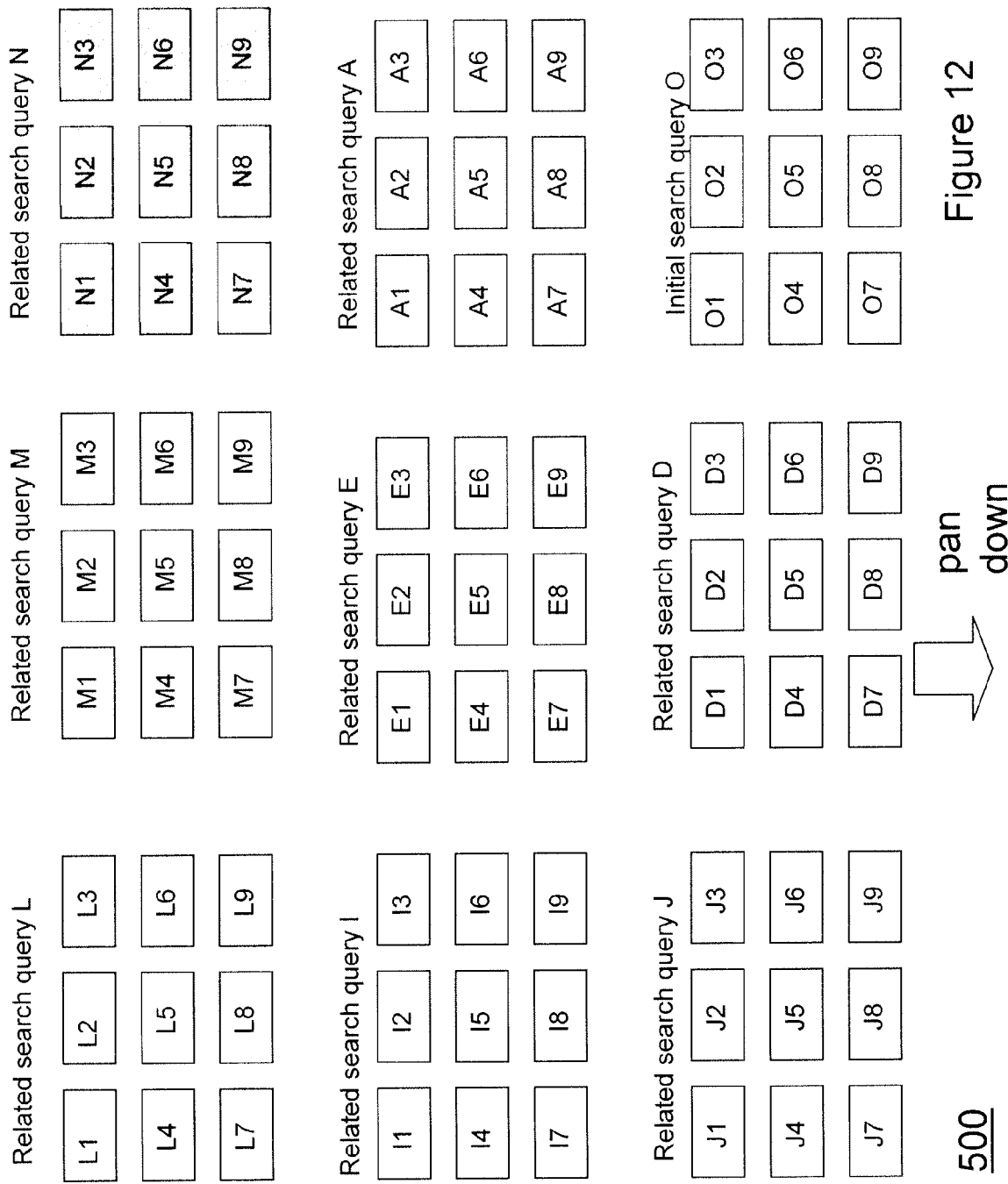

In FIG. 12, the image space was panned down and related search queries were filled in with related search queries L, M and N. These search queries are additive results of adjacent search queries, meaning related search query L is a related search query for search query I+E, related search query J is a related search query for search query I+E+A, related search query N is a related search query for search query E+A. During this pan, the user of the client decided that Query N had images related to the image for which they were searching so the user of the client zoomed into panel N shown in FIG. 13.

FIG. 13 shows the highest ranked search results for query N, in this example, 60 images were shown but an exhaustive list of all related images or anything else can be shown. In this example, the user of the client decided image 25 was the target image and this image was chosen. Once an image is chosen the client display can be transported to a landing page where the image can be viewed alone or as part of a webpage or some other web-based or offline function.

In summary, the system starts with a single query, when new spaces become visible on screen, the system is consulted to figure out the optimal query to put in that space. The nearby queries are used as seeds, and the radius is grown if nothing relevant is found for adjacent cells. Using this method, it is possible to explore indefinitely, until such time as one reaches the end of the nodes available (>1M in this case) or you have exhausted all available queries.

This system allows a client to quickly explore very far, and get a rich variety of data, but also allows a client to stay in a single area controlled to some degree by the speed of navigation, since going fast means you're following a string of queries, whereas going slowly creates more of an enlarged-circle effect, with more localization.

The exploration space can be shown in a 2-d format but it doesn't need to be in 2-d (either limited to it, or forced into it). It's possible to use this system to explore related queries on search results in a linear manner.

There are many possible implementations of this client interface, including different ways for a client to navigate through the client interface and different ways to construct the client interface.

FIG. 14 illustrates an example system 100 that includes a search system 102 and a user device 106. The search system 102 receives queries 104 from a user device 106 and presents search results 108 to the user device, for example, through a network. The user device 106 submits queries 104 to the search system 102, receives search results 108 from the search system 102, and presents the search results to a user.

The search system 102 includes a search engine 110 and a scoring model engine 112. The search engine 110 receives the query 104 from the user device 106. In response to receiving the query 104, the search engine 110 identifies images indexed in its image index 114 that are responsive to the query 104. Images include, for example, still images, video, and other visual content. The image index 114 associates an identifier for each image with data for the image. The data for the image includes, for example, keywords used to determine when the image is relevant to queries, details on where to obtain the image, and optionally image features extracted from the image. The search engine 110 identifies a number of images that are responsive to the query 104. This can be done using conventional techniques, for example, based on how well text associated with the images matches the query.

The search engine 110 then ranks the responsive images using a ranking engine 116 that applies a query-specific scoring model 118 to the features for each image. The ranking engine 116 can receive the features for the responsive images 120 from the image index 114. Alternatively, the ranking engine 116 can receive the responsive images themselves and extract the features for each image. The ranking engine 116 can receive the responsive images, for example, from an image cache maintained by the search system 102, or from the original source of the image.

The scoring model 118 is specific to the query 104, and specifies a weight for each of a number of image features. In some implementations, the scoring model is implemented as a passive-aggressive model for image retrieval ("PAMIR"). A PAMIR is a linear model that can be applied to non-linear decisions. A PAMIR is implemented as a vector of weights, with each weight corresponding to a distinct image feature. The model is trained by iteratively computing dot products of the vector of weights representing the model and feature vectors representing the images, and appropriately updating the weights after each iteration.

The ranking engine 118 receives the query-specific scoring model 122 from a store of query-specific data 124 maintained by the scoring model engine 112. The query-specific data 124 includes, for each of a number of queries, a scoring model for the query, and positive and negative images for the query. The query-specific data 124 is used and updated by a training engine 126.

To determine the score for a given image, the ranking engine 118 applies the model to the image features, for example, by taking the dot product of a vector of the image features and a vector of the weights for the image features. For example, the score can be calculated according to the formula: score=WX, where W is a vector storing the weights for the query-specific scoring model 118, and X is a vector of feature values for an image responsive to the query 104. Once the ranking engine 118 calculates a score for each image, the ranking engine 118 ranks the responsive images 116 according to their scores. The search engine 110 then generates a search results page 108 that includes the images in ranked order and sends the search results page 108 to the user device 106.

The user device 104 submits a search query 106 to the search system 104, receives the search results page 108 with the images responsive to the query, and renders the search results page 108 for presentation to a user. When a user clicks, e.g., selects with a mouse or other input device, an image in the search results page 108, the user device 106 sends data about the selection to the search system 102. While the above describes ranking images responsive to a user query, similar techniques can be used for ranking other resources, for example, documents, by applying query-specific scoring models trained on features of the documents.

FIG. 15 is a schematic diagram of an example of a system for presenting image search results. The system includes one or more processors 23, 33, one or more display devices 21, e.g., CRT, LCD, one or more interfaces 25, 32, input devices 22, e.g., touchscreen, keyboard, mouse, etc., and one or more computer-readable mediums 24, 34. These components exchange communications and data using one or more buses 41, 42, e.g., EISA, PCI, PCI Express, etc.

The presenting search results can be performed by a device 20 at which the images are displayed, or a server device can present the client interface by sending code to a receiving device that renders the code to cause the display of the client interface being presented. Once the image space is created, a user of a client can browse the image space and choose an image that most closely resembles a target image. The system 10 modifies the client interface in response to input by the user of the client from the displayed images. Moreover, such modification can be performed by the device on which the images are displayed using code sent by a server device 30 in one communication session, or through ongoing interactions with a server system.

The term "computer-readable medium" refers to any non-transitory medium 24, 34 that participates in providing instructions to processors 23, 33 for execution. The computer-readable mediums 24, 34 further include operating systems 26, 31 with network communication code, image grouping code, images presentation code, and other program code.

The operating systems 26, 31 can be multi-client, multi-processing, multitasking, multithreading, real-time, near real-time and the like. The operating systems 26, 31 can perform basic tasks, including but not limited to: recognizing input from input devices 22; sending output to display devices 21; accounting for files and directories on computer-readable mediums 24, 34, e.g., memory or a storage device; controlling peripheral devices, e.g., disk drives, printers, etc; and managing traffic on the one or more buses 41, 42. The operating system 31 can also run algorithms associated with the related search engine 35 and the image search engine 36.

The network communications code can include various components for establishing and maintaining network connections, e.g., software for implementing communication protocols, e.g., TCP/IP, HTTP, Ethernet, etc.

The image grouping code can provide various software components for performing the various functions for grouping image search results, which can include clustering or otherwise assessing similarity among images. The images presentation code can also provide various software components for performing the various functions for presenting and modifying a client interface showing the image search results.

Moreover, in some implementations, the system of FIG. 14 is split into a client-server environment communicatively connected over the internet 40 with connectors 41, 42, where one or more server computers 30 include hardware as shown in FIG. 14 and also the image grouping code, code for searching and indexing images on a computer network, and code for generating image results for submitted queries, and where one or more client computers 20 include hardware as shown in FIG. 14 and also the images presentation code, which can be pre-installed or delivered in response to a query, e.g., an HTML page with the code included therein for interpreting and rendering by a browser program.

Implementations of the subject matter and the operations described in this specification can be done in electronic circuitry, or in computer software, firmware, or hardware, including the structures disclosed in this specification and their structural equivalents, or in combinations of one or more of them. Implementations of the subject matter described in this specification can be done as one or more computer programs, e.g., one or more modules of computer program instructions, encoded on a computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be, or can be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, e.g., a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer comprise a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a client, implementations of the subject matter described in this specification can be implemented on a computer having a display device, e.g., a CRT (cathode ray tube) or LCD (liquid crystal display) monitor, for displaying information to the user of the client and a keyboard and a pointing device, e.g., a mouse or a trackball, by which the user of the client can provide input to the computer. Other kinds of devices can be used to provide for interaction with a client as well; for example, feedback provided to the client can be any form of sensory feedback, e.g., visual feedback, auditory feedback, or tactile feedback; and input from the client can be received in any form, including acoustic, speech, thought or tactile input. In addition, a computer can interact with a client by sending documents to and receiving documents from a device that is used by the client; for example, by sending web pages to a web browser on a client's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical client interface or a Web browser through which a user of a client can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving client input from a client interacting with the client device. Data generated at the client device, e.g., a result of the client interaction, can be received from the client device at the server.

While this specification contains many specific implementation details, these should not be construed as limitations on the scope of the disclosed technology or of what can be claimed, but rather as descriptions of features specific to particular implementations of the disclosed technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. In some cases, the actions recited in the claims can be performed in a different order and still achieve desirable results. Moreover, the separation of various system components in the implementations described above should not be understood as requiring such separation in all implementations, and it should be understood that the described program components and systems can generally be integrated together in a single software product or packaged into multiple software products.

The systems and techniques described here can be applied to videos or other visual contents, and they can also be applied to various sources of images, irrespective of any image search or images search results, e.g., a photo album either in the cloud or on the client's computer, stock photo collections, or any other image collections.

The foregoing Detailed Description is to be understood as being in every respect illustrative, but not restrictive, and the scope of the disclosed technology disclosed herein is not to be determined from the Detailed Description, but rather from the claims as interpreted according to the full breadth permitted by the patent laws. It is to be understood that the implementations shown and described herein are only illustrative of the principles of the disclosed technology and that various modifications can be implemented without departing from the scope and spirit of the disclosed technology.

The invention claimed is:

1. A method comprising:
   receiving an initial search query;
   determining a plurality of first search queries related to the initial search query;
   obtaining image results associated with the initial search query, and obtaining respective image results associated with each first search query related to the initial search query;
   generating, from respective obtained image results, a panel of images comprising images associated with the initial search query, and panels of images each comprising images associated with a respective first search query related to the initial search query;
   providing an image space for presentation, the image space being centered on the panel comprising images associated with the initial search query and being surrounded by the panels of images each comprising images associated with a respective first search query related to the initial search query;
   receiving at least one input to browse the image space;
   in response to receiving at least one input to browse the image space, determining one or more second search queries different from the initial search query and the first plurality of search queries.

2. The method of claim 1 further comprising:
   modifying the image space in response to receiving the at least one input, wherein modifying comprises panning the image space in an x-y direction or zooming the image space in a z-direction.

3. The method of claim 2 further comprising:
   storing information identifying the initial search query and the first plurality of search queries related to the initial search query, wherein images related to stored queries are not provided again for presentation in the image space.

4. The method of claim 2, further comprising:
   determining that the image space is fully zoomed in on a particular panel; and
   providing, for presentation, all images associated with a search query associated with the particular panel.

5. The method of claim 1, wherein determining a second search query in response to receiving at least one input to browse the image space comprises:
   identifying an adjacent panel of images in the image space, and
   additively weighting search queries that are each associated with a respective panel of the identified adjacent panel of images.

6. The method of claim 1, further comprising:
   in response to receiving at least one input to browse the image space, determining that a second search query cannot be determined; and
   generating a back edge to a previous search query.

7. The method of claim 1, wherein determining a second search query in response to receiving at least one input to browse the image space comprises:
   splitting keywords of a previous search query into at least two search queries; and
   performing a related query search on at least one of the two search queries to obtain the second search query.

8. The method of claim 1 further comprising:
   receiving at least one input indicating a target image was found; and
   providing for presentation, a landing page associated with the target image.

9. The method of claim 1, wherein determining the first plurality of search queries related to the initial search query comprises:
   obtaining information identifying search queries that were previously provided to a search engine as refinements to the initial search query.

10. A system comprising:
one or more processors;
one or more computer-readable storage mediums containing instructions configured to cause the one or more processors to perform operations comprising:
receiving an initial search query;
determining a plurality of first search queries related to the initial search query;
obtaining image results associated with the initial search query, and obtaining respective image results associated with first search query related to the initial search query;
generating, from respective obtained image results, a panel of images comprising images associated with the initial search query, and -panels of images each comprising images associated with a respective first search query related to the initial search query;
providing an image space for presentation, the image space being centered on the panel comprising images associated with the initial search query and being surrounded by the panels of images each comprising images associated with a respective first search query related to the initial search query;
receiving at least one input to browse the image space;
in response to receiving at least one input to browse the image space, determining one or more second search queries different from the initial search query and the first plurality of search queries.

11. The system of claim 10, wherein the operations further comprise:
modifying the image space in response to receiving the at least one input, wherein modifying comprises panning the image space in an x-y direction or zooming the image space in a z-direction.

12. The system of claim 11 wherein the operations further comprise:
storing information identifying the initial search query and the first plurality of search queries related to the initial search query, wherein images related to stored queries are not provided again for presentation in the image space.

13. The system of claim 10, wherein determining a second search query in response to receiving at least one input to browse the image space comprises:
identifying an adjacent panel of images in the image space; and
additively weighting search queries that are each associated with a respective panel of the identified adjacent panel of images.

14. The system of claim 10, wherein the operations further comprise:
in response to receiving at least one input to browse the image space, determining that a second search query cannot be determined; and
generating a back edge to a previous search query.

15. The system of claim 10, wherein determining a second search query in response to receiving at least one input to browse the image space comprises:
splitting keywords of a previous search query into at least two search queries; and
performing a related query search on at least one of the two search queries to obtain the second search query.

16. The system of claim 10, wherein determining the first plurality of search queries related to the initial search query comprises:
obtaining information identifying search queries that were previously provided to a search engine as refinements to the initial search query.

17. A computer-program product, the product tangibly embodied in a machine-readable storage medium, including instructions configured to cause a data processing apparatus to perform operations comprising:
receiving an initial search query;
determining a plurality of first search queries related to the initial search query;
obtaining image results associated with the initial search query, and obtaining respective image results associated with each first search query related to the initial search query;
generating, from respective obtained image results, a panel of images comprising images associated with the initial search query, and -panels of images each comprising images associated with a respective first search query related to the initial search query; and
providing an image space for presentation, the image space being centered on the panel comprising images associated with the initial search query and being surrounded by the panels of images each comprising images associated with a respective first search query related to the initial search query;
receiving at least one input to browse the image space;
in response to receiving at least one input to browse the image space, determining one or more second search queries different from the initial search query and the first plurality of search queries.

18. The computer-program product of claim 17, wherein the operations further comprise:
modifying the image space in response to receiving the at least one input, wherein modifying comprises panning the image space in an x-y direction or zooming the image space in a z-direction.

19. The computer-program product of claim 18 wherein the operations further comprise:
storing information identifying the initial search query and the first plurality of search queries related to the initial search query, wherein images related to stored queries are not provided again for presentation in the image space.

20. The computer-program product of claim 17, wherein determining a second search query in response to receiving at least one input to browse the image space comprises:
identifying an adjacent panel of images in the image space; and
additively weighting search queries that are each associated with a respective panel of the identified adjacent panel of images.

21. The computer-program product of claim 17 wherein the operations further comprise:
in response to receiving at least one input to browse the image space, determining that a second search query cannot be determined; and
generating a back edge to a previous search query.

22. The computer-program product of claim 17 wherein determining a second search query in response to receiving at least one input to browse the image space comprises:
splitting keywords of a previous search query into at least two search queries; and
performing a related query search on at least one of the two search queries to obtain the second search query.

23. The computer-program product of claim 17, wherein determining the first plurality of search queries related to the initial search query comprises:

obtaining information identifying search queries that were previously provided to a search engine as refinements to the initial search query.

* * * * *